United States Patent
Berardino et al.

(10) Patent No.: US 10,893,385 B1
(45) Date of Patent: Jan. 12, 2021

(54) DETECTION OF A PHYSICAL COLLISION BETWEEN TWO CLIENT DEVICES IN A LOCATION SHARING SYSTEM

(71) Applicant: Snap Inc., Santa Monica, CA (US)

(72) Inventors: Axel Berardino, Pairs (FR); Antoine Martin, Paris (FR); Steeve Morin, Paris (FR)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/434,547

(22) Filed: Jun. 7, 2019

(51) Int. Cl.
| H04W 4/029 | (2018.01) |
| H04W 4/02 | (2018.01) |
| H04W 64/00 | (2009.01) |
| H04W 4/12 | (2009.01) |
| H04W 4/38 | (2018.01) |

(52) U.S. Cl.
CPC .......... *H04W 4/029* (2018.02); *H04W 4/027* (2013.01); *H04W 4/12* (2013.01); *H04W 4/38* (2018.02); *H04W 64/00* (2013.01)

(58) Field of Classification Search
None
See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |

(Continued)

FOREIGN PATENT DOCUMENTS

| | | |
|---|---|---|
| CN | 109863532 | 6/2019 |
| CN | 110168478 | 8/2019 |

(Continued)

*Primary Examiner* — Saumit Shah
(74) *Attorney, Agent, or Firm* — Schwegman Lundberg & Woessner, P.A.

(57) ABSTRACT

The invention provides methods, systems, and devices for detecting a physical collision between two client devices based on sensor data. A server computer receives a first collision signature from a first client device, and a second collision signature from a second client device. Based on determining that a correlation of the first collision signature and the second collision signature does not achieve a detection threshold, the server computer lowers, for a limited period of time, the detection threshold. If the server computer receives, within the limited period of time, a third collision signature from the first client device, and a fourth collision signature from the second client device, and determines that a correlation of the third collision signature and the fourth collision signature achieves the lowered detection threshold, the server computer detects a collision between the first and second client devices.

20 Claims, 13 Drawing Sheets

(56) References Cited

U.S. PATENT DOCUMENTS

| | | | |
|---|---|---|---|
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0167646 A1* | 7/2010 | Alameh ............... H04W 12/06 455/41.2 |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0065517 A1* | 3/2013 | Svensson ............ H04W 12/06 455/39 |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0282068 A1* | 9/2014 | Levkovitz ............ H04L 67/10 715/748 |
| 2015/0206349 A1 | 7/2015 | Rosenthal et al. |
| 2015/0318874 A1* | 11/2015 | Donaldson ........... H04W 4/80 367/135 |
| 2016/0057565 A1* | 2/2016 | Gold .................... H04W 4/80 455/41.1 |
| 2016/0134840 A1 | 5/2016 | Mcculloch |
| 2016/0234169 A1 | 8/2016 | Tsuda et al. |
| 2016/0344712 A1* | 11/2016 | Ding .................... H04L 9/14 |
| 2017/0032114 A1* | 2/2017 | Turgeman ........... H04W 12/06 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0054509 A1* | 2/2018 | Nuescheler ....... H04M 1/72569 |
| 2018/0113587 A1 | 4/2018 | Allen et al. |
| 2018/0115503 A1 | 4/2018 | Baldwin et al. |
| 2018/0315076 A1 | 11/2018 | Andreou |

(56) References Cited

U.S. PATENT DOCUMENTS

| | | |
|---|---|---|
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |

FOREIGN PATENT DOCUMENTS

| | | |
|---|---|---|
| EP | 2184092 | 5/2010 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |

\* cited by examiner

DETECTION OF A PHYSICAL COLLISION BETWEEN TWO CLIENT DEVICES IN A LOCATION SHARING SYSTEM

BACKGROUND

The popularity of electronic messaging, particularly instant messaging, continues to grow. Users increasingly share media content items such as electronic images and videos with each other, reflecting a global demand to communicate more visually. Similarly, users increasingly seek to customize the media content items they share with others, providing challenges to social networking systems seeking to generate custom media content for their members. Embodiments of the present disclosure address these and other issues.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
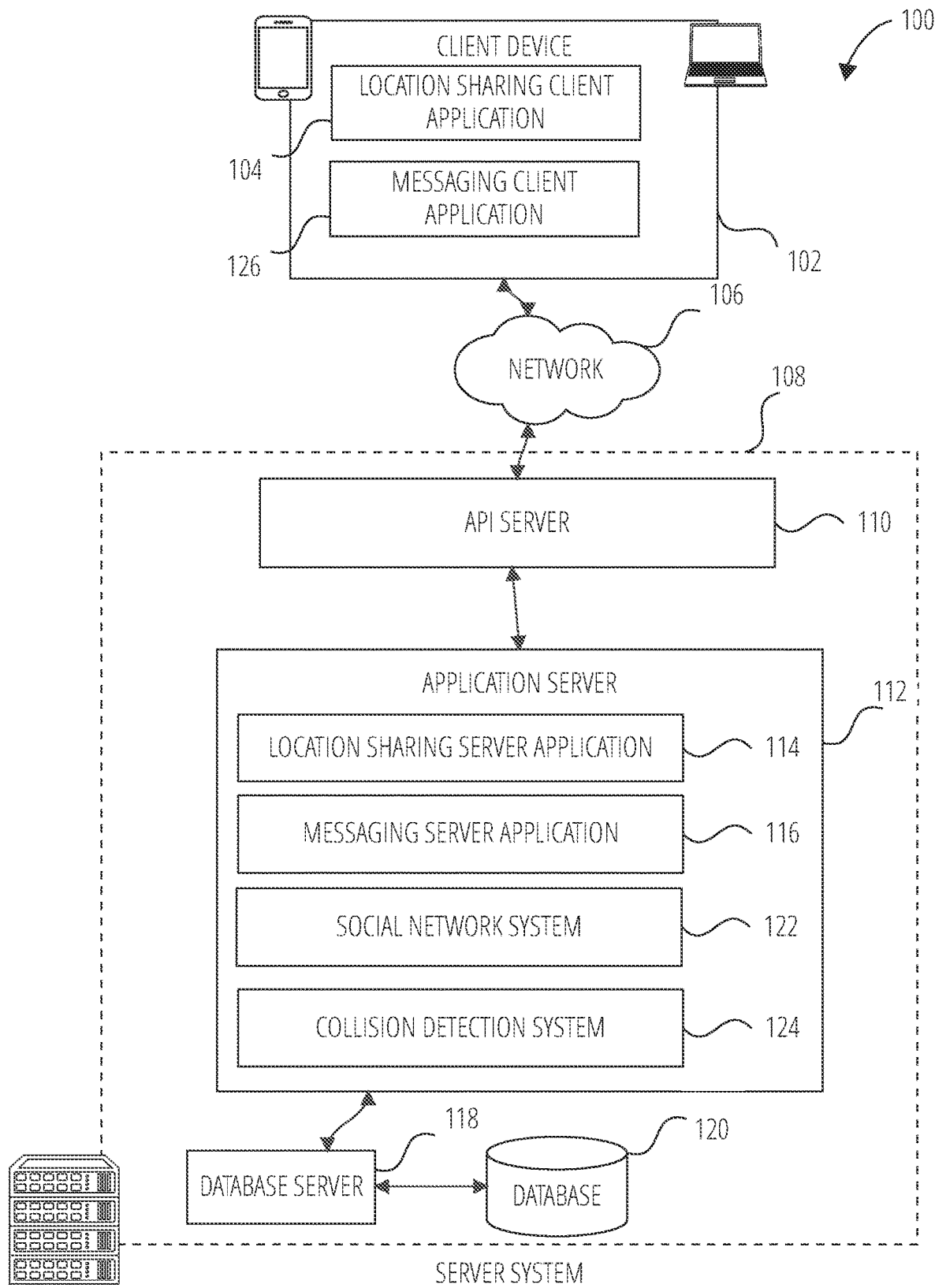
FIG. 1 is a diagrammatic representation of a networked environment in which the present disclosure may be deployed, in accordance with some example embodiments.

Embodiments of the present disclosure provide a method for detecting a physical collision between two client devices based on sensor data. When two users tap or knock their phones together, each phone detects a collision, and sends, to the application server, a collision signature including a variety of sensor data which includes a timestamp, a location of the phone, and acceleration data acquired by an accelerometer embedded in the phone. The server computer correlates all the collision signatures received to identify two collision signatures that correspond to a same physical collision. Based on identifying two collision signatures corresponding to a same physical collision, the server computer determines that the two phones have been taped or knocked together. Because of the limited accuracy of the location and accelerometer data acquired by the phones, false positives (improper detection of a collision in the absence of a collision), and false negatives (missed detection of a collision) are frequent.

Motivated by these challenges, some embodiments of the present disclosure provide improvements in the operation of a collision detection system by reducing errors and therefore improving the collision detection system by more accurately detecting a collision between two client devices. In some embodiments, some of these improvements are achieved by setting a low detection threshold, and temporarily increasing the detection threshold of two client devices in response to receiving a collision signature from each of the two client devices and determining that the two collision signatures do not quite achieve the detection threshold.

In an example scenario, two users tap their phones together a first time. Each of the two phones generates and sends a collision signature to the server. The server correlates the two collision signatures and determines that the correlation of the two collision signatures does not achieve the detection threshold. In response to determining that the correlation of the two collision signatures does not achieve the detection threshold, the server lowers the detection threshold for a limited time. Upon noticing that the collision has not been detected, the two users tap their phones together a second time. Each of the two phones generates and sends another collision signature to the server. This time, because the detection threshold is temporarily lowered, the correlation of the two collision signatures is more likely to achieve the detection threshold. As such, even if the server does not detect the first collision, the server is more likely to detect the second collision, thereby reducing the global false negative rate. Meanwhile, because the probability of detecting two false positives in a short amount of time is low, the global false positive rate is not significantly increased.

For example, in some embodiments, a server computer receiving a first collision signature from a first client device, and a second collision signature from a second client device. Based on determining that a correlation of the first collision signature and the second collision signature does not achieve a detection threshold, the server computer lowers, for a limited period of time, the detection threshold. Within the limited period of time, the server computer receives a third collision signature from the first client device, and a fourth collision signature from the second client device. In response to determining that a correlation of the third collision signature and the fourth collision signature achieves the lowered detection threshold, the server computer detects a collision between the first and second client devices.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

FIG. 1 is a block diagram showing an example location sharing system 100 for exchanging location data over a network. The location sharing system 100 includes multiple instances of a client device 102, each of which hosts a number of applications including a location sharing client application 104. Each location sharing client application 104 is communicatively coupled to other instances of the location sharing client application 104 and a location sharing server system 108 via a network 106 (e.g., the Internet). In particular, in some cases, the client device 102 accesses the network 106 via a cellular base station 128, which is a relay located at the center of a cell of a cellular network.

A location sharing client application 104 is able to communicate and exchange data with another location sharing client application 104 and with the location sharing server system 108 via the network 106. The data exchanged between location sharing client application 104, and between a location sharing client application 104 and the location sharing server system 108, includes functions (e.g., commands to invoke functions) as well as payload data (e.g., location data, text, audio, video or other multimedia data).

The location sharing server system 108 provides server-side functionality via the network 106 to a particular location sharing client application 104. While certain functions of the location sharing system 100 are described herein as being performed by either a location sharing client application 104 or by the location sharing server system 108, the location of certain functionality either within the location sharing client application 104 or the location sharing server system 108 is a design choice. For example, it may be technically preferable to initially deploy certain technology and functionality within the location sharing server system 108, but to later migrate this technology and functionality to the location sharing client application 104 where a client device 102 has a sufficient processing capacity.

The location sharing server system 108 supports various services and operations that are provided to the location sharing client application 104. Such operations include transmitting data to, receiving data from, and processing data generated by the location sharing client application 104. This data may include, geolocation information, message content, client device information, media annotation and overlays, message content persistence conditions, social network information, and live event information, as examples. Data exchanges within the location sharing system 100 are invoked and controlled through functions available via user interfaces (UIs) of the location sharing client application 104.

Turning now specifically to the location sharing server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., methods and protocols) that can be called or queried by the location sharing client application 104 in order to invoke functionality of the application server 112. The Application Program Interface (API) server 110 exposes various functions supported by the application server 112, including account registration, login functionality, the sending of messages, via the application server 112, from a particular location sharing client application 104 to another location sharing client application 104, the sending of media files (e.g., images or video) from a location sharing client application 104 to the location sharing server application 114, and for possible access by another location sharing client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the location sharing client application 104).

The application server 112 hosts a number of applications and subsystems, including a location sharing server application 114, a messaging server application 116, a social network system 122, and a collision detection system 124.

Examples of functions and services supported by the location sharing server application 114 include generating a map GUI. In some embodiments, the map GUI may include representations of at least approximate respective positions of a user and a user's friends in a social network graph accessed by the social media application using avatars for each respective user.

The location sharing server application 114 may receive user authorization to use, or refrain from using, the user's location information. In some embodiments, the location sharing server application 114 may likewise opt to share or not share the user's location with others via the map GUI. In some cases, the user's avatar may be displayed to the user on the display screen of the user's computing device regardless of whether the user is sharing his or her location with other users.

In some embodiments, a user can select groups of other users to which his/her location will be displayed and may in specify different display attributes for the different respective groups or for different respective individuals. In one example, audience options include: "Best Friends," "Friends," and "Custom" (which is an individual-level whitelist of people). In this example, if "Friends" are selected, all new people added to the user's friends list will automatically be able to see their location. If they are already sharing with the user, their avatars will appear on the user's map.

In some embodiments, when viewing the map GUI, the user is able to see the location of all his/her friends that have shared their location with the user on the map, each friend represented by their respective avatar. In some embodiments, if the friend does not have an avatar, the friend may be represented using a profile picture or a default icon displayed at the corresponding location for the friend.

In some embodiments, the user can select between friends on the map via a menu, such as a carousel. In some embodiments, selecting a particular friend automatically centers the map view on the avatar of that friend. Embodiments of the present disclosure may also allow the user to take a variety of actions with the user's friends from within the map GUI. For example, the system may allow the user to chat with the user's friends without leaving the map. In one particular example, the user may select a chat icon from a menu presented in conjunction with the map GUI to initiate a chat session.

The messaging server application 116 implements a number of message processing technologies and functions, particularly related to the aggregation and other processing of content (e.g., textual and multimedia content) included in messages received from multiple instances of the location sharing client application 104. As will be described in further detail, the text and media content from multiple sources may be aggregated into collections of content (e.g., called stories or galleries). These collections are then made available, by the location sharing server application 114, to the location sharing client application 104. Other processor and memory intensive processing of data may also be performed server-side by the location sharing server application 114, in view of the hardware requirements for such processing.

The application server 112 is communicatively coupled to a database server 118, which facilitates access to a database 120 in which is stored data processed by the location sharing server application 114.

Figure 3:
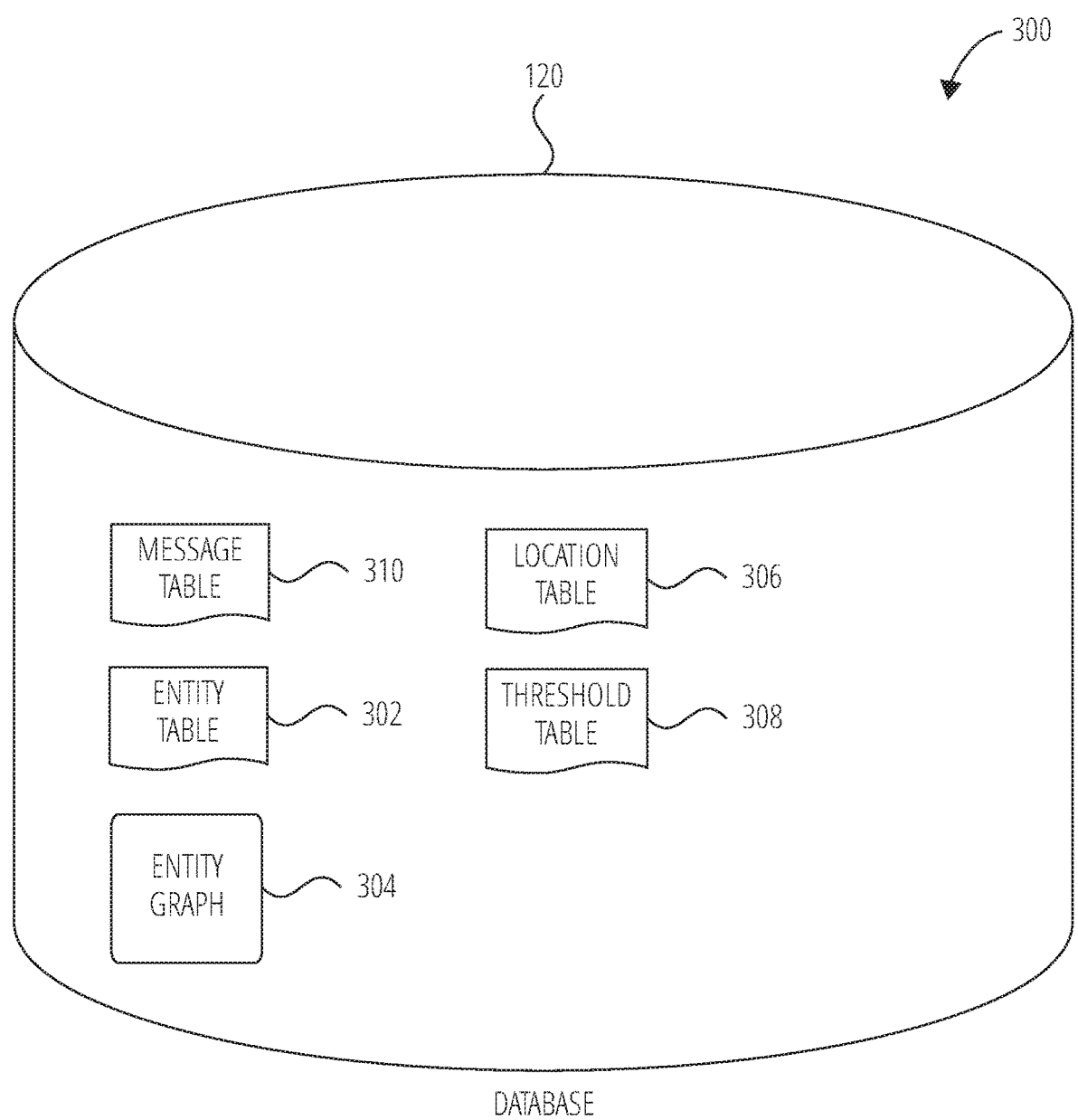
FIG. 3 is a diagrammatic representation of a data structure as maintained in a database, in accordance with some example embodiments.

The social network system 122 supports various social networking functions services and makes these functions and services available to the location sharing server application 114. To this end, the social network system 122 maintains and accesses an entity graph 304 (as shown in FIG. 3) within the database 120. Examples of functions and services supported by the social network system 122 include the identification of other users of the location sharing system 100 with which a particular user has relationships or is "following", and also the identification of other entities and interests of a particular user.

The collision detection system 124 supports a collision detection functionality and makes this function available to the location sharing server application 114. The collision detection system 124 receives collision signatures from client devices and correlates the collision signatures received to identify pairs of collision signatures corresponding to a same physical collision.

Figure 2:
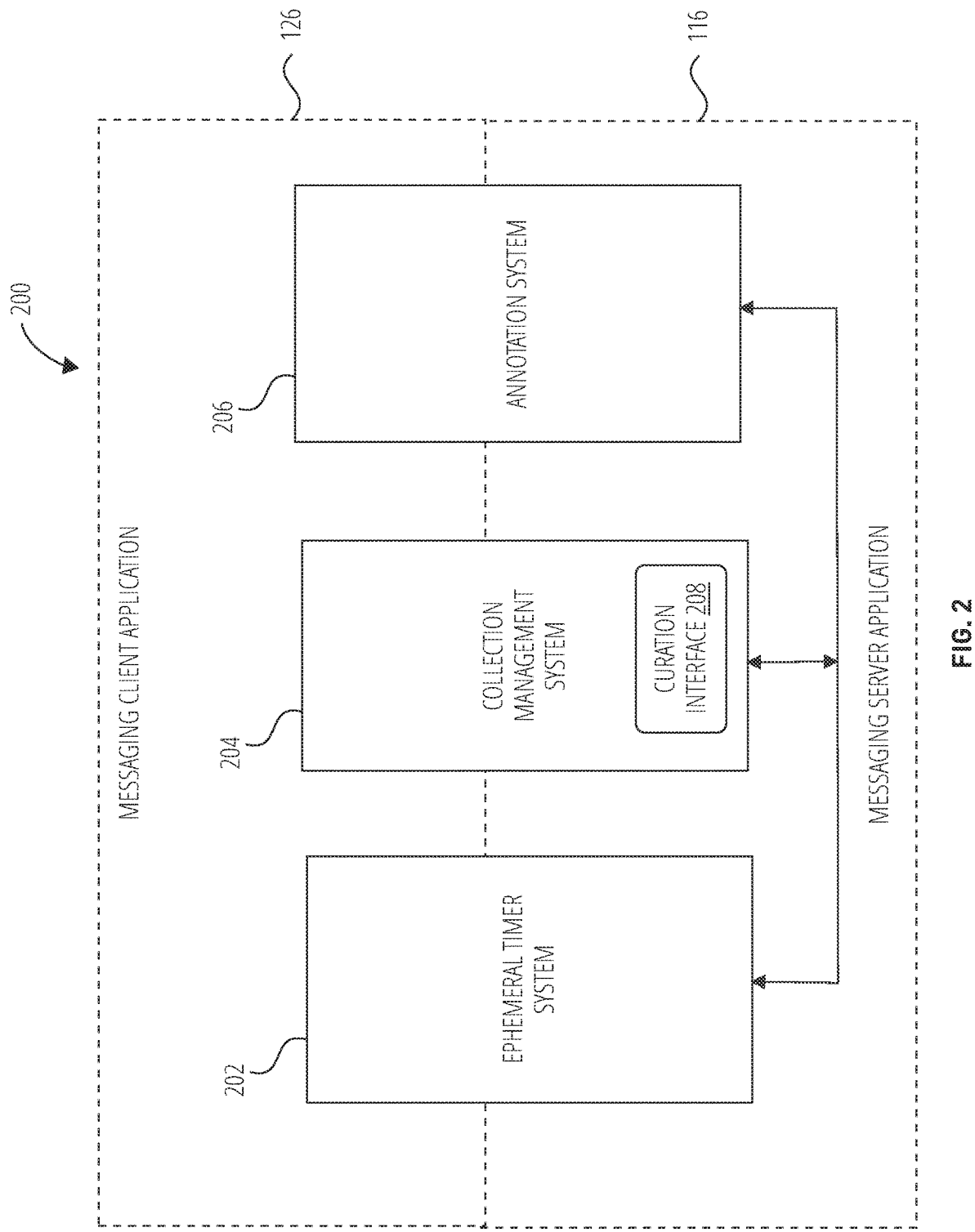
FIG. 2 illustrates a messaging system in accordance with some example embodiments.

FIG. 2 is block diagram illustrating further details regarding the messaging system 200, according to example embodiments. Specifically, the messaging system 200 includes the messaging server application 116 and the messaging client application 126, which in turn embody a number of subsystems, namely an ephemeral timer system 202, a collection management system 204, and an annotation system 206.

The ephemeral timer system 202 is responsible for enforcing the temporary access to content permitted by the messaging client application 126 and the location sharing server application 114. To this end, the ephemeral timer system 202 incorporates a number of timers that, based on duration and display parameters associated with a message, or collection of messages (e.g., a story), selectively display and enable access to messages and associated content via the messaging client application 126. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 126.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the location sharing system 100. The annotation system 206 operatively supplies a media overlay or supplementation (e.g., an image filter) to the messaging client application 126 based on a geolocation of the client device 102. In another example, the annotation system 206 operatively supplies a media overlay to the messaging client application 126 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the location sharing server system 108, according to certain example embodiments. While the content of the database 120 is shown to comprise a number of tables, it will be appreciated that the data could be stored in other types of data structures (e.g., as an object-oriented database).

The database 120 includes message data stored within a message table 310. An entity table 302 stores entity data, including an entity graph 304. Entities for which records are maintained within the entity table 302 may include individuals (e.g., users), corporate entities, organizations, objects, places, events, etc. Regardless of type, any entity regarding which the location sharing server system 108 stores data may be a recognized entity. Each entity is provided with a unique identifier, as well as an entity type identifier (not shown). The entity graph 304 furthermore stores information regarding relationships and associations between entities. Such relationships may be social, professional (e.g., work at a common corporation or organization) interested-based or activity-based, merely for example. A location table 306 stores location data of users (e.g., geolocation information determined by a GPS unit of the client device (e.g., client device 102)). A threshold table 308 may store threshold values for the client devices. Various thresholds (e.g., detection threshold, time threshold, distance threshold) are used to detect collisions between client devices, and the values of the different threshold may be temporally changes for a specific pair of client devices in certain circumstances.

Figure 4:
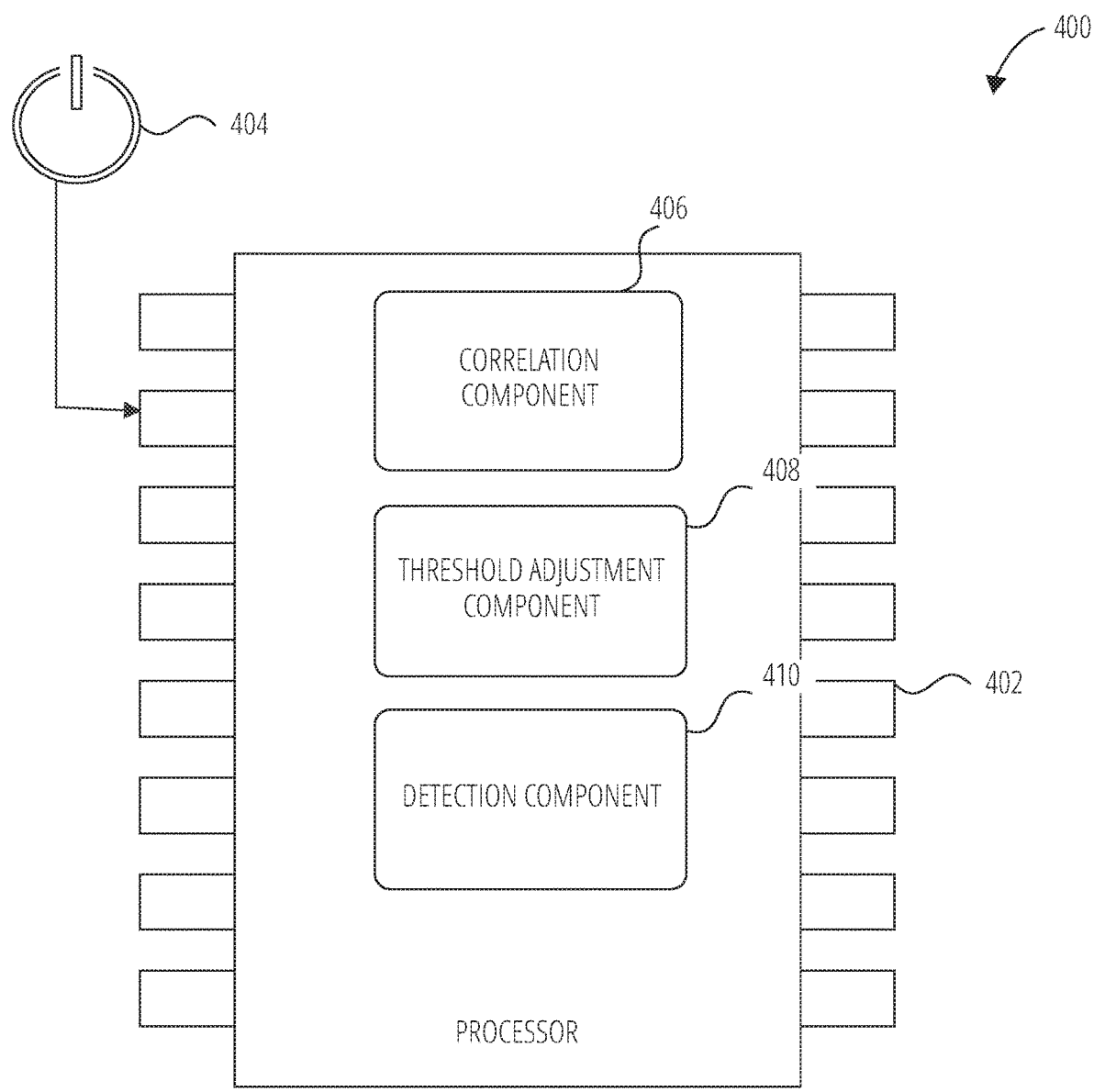
FIG. 4 is a diagrammatic representation of a processing environment, in accordance with some example embodiments.

Turning now to FIG. 4, there is shown a diagrammatic representation of a processing environment 400, which includes at least a processor 402 (e.g., a GPU, CPU or combination thereof).

The processor 402 is shown to be coupled to a power source 404, and to include (either permanently configured or temporarily instantiated) modules, namely a correlation component 406, a threshold adjustment component 408 and a detection component 410. The correlation component 406 correlates collision signatures to identify pairs of collision signatures corresponding to a same physical collision. The threshold adjustment component 408 adjusts various threshold for detecting a collision. The detection component 410 detects a collision between two client devices based on determining that the correlation of the collision signatures received from the two client devices achieves a detection threshold.

Figure 5:
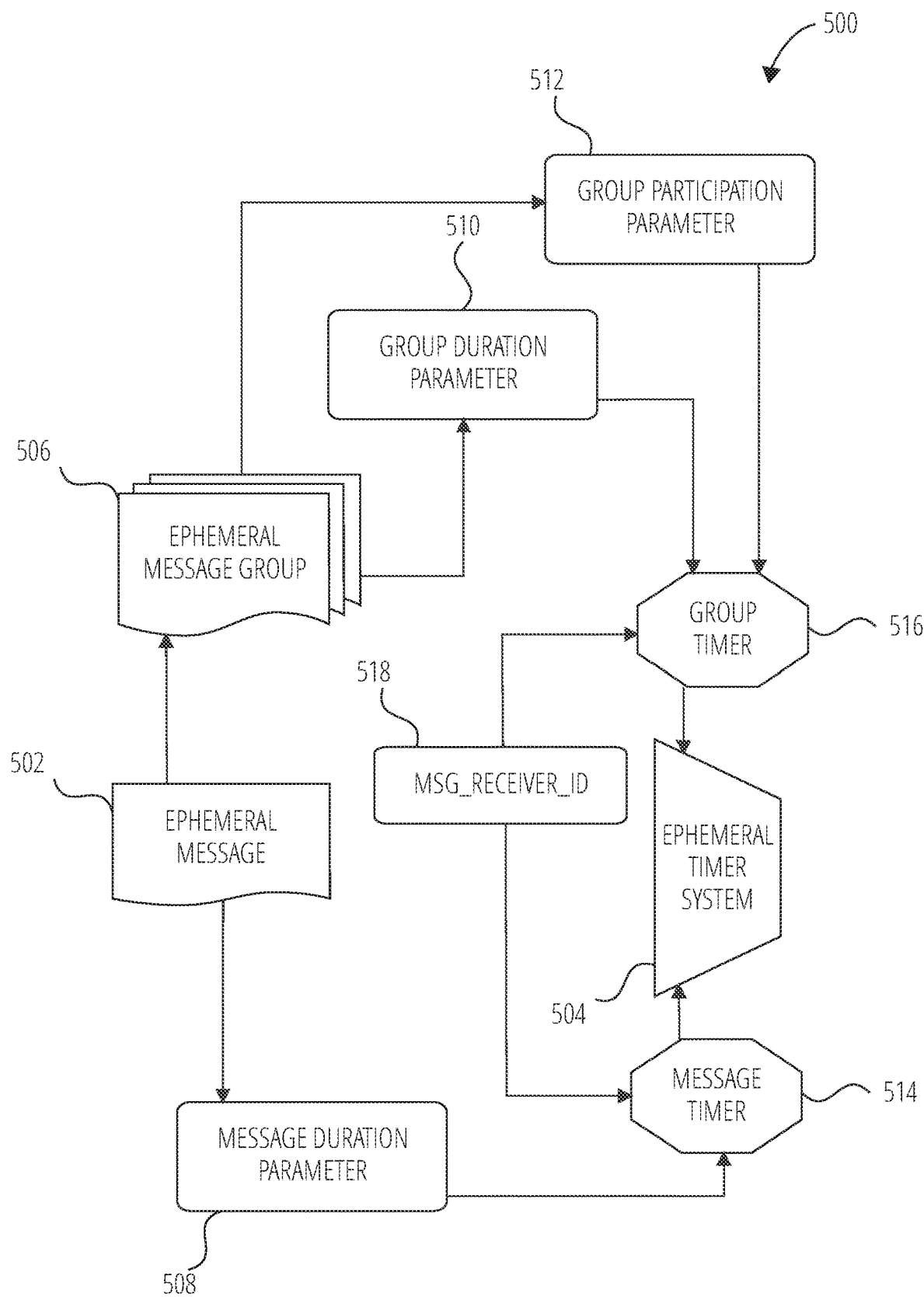
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 506) may be time-limited (e.g., made ephemeral).

An ephemeral message 502 is shown to be associated with a message duration parameter 508, the value of which determines an amount of time that the ephemeral message 502 will be displayed to a receiving user of the ephemeral message 502 by the location sharing client application 104. In one embodiment, an ephemeral message 502 is viewable by a receiving user for up to a maximum of 10 seconds, depending on the amount of time that the sending user specifies using the message duration parameter 508.

The message duration parameter 508 and the message receiver identifier 518 are shown to be inputs to a message timer 514, which is responsible for determining the amount of time that the ephemeral message 502 is shown to a particular receiving user identified by the message receiver identifier 518. In particular, the ephemeral message 502 will only be shown to the relevant receiving user for a time period determined by the value of the message duration parameter 508. The message timer 514 is shown to provide output to a more generalized ephemeral timer system 504, which is responsible for the overall timing of display of content (e.g., an ephemeral message 502) to a receiving user.

The ephemeral message 502 is shown in FIG. 5 to be included within an ephemeral message group 506 (e.g., a collection of messages in a personal story, or an event story). The ephemeral message group 506 has an associated group duration parameter 510, a value of which determines a time-duration for which the ephemeral message group 506 is presented and accessible to users of the location sharing system 100. The group duration parameter 510, for example, may be the duration of a music concert, where the ephemeral message group 506 is a collection of content pertaining to that concert. Alternatively, a user (either the owning user or a curator user) may specify the value for the group duration parameter 510 when performing the setup and creation of the ephemeral message group 506.

Additionally, each ephemeral message 502 within the ephemeral message group 506 has an associated group participation parameter 512, a value of which determines the duration of time for which the ephemeral message 502 will be accessible within the context of the ephemeral message group 506. Accordingly, a particular ephemeral message group 506 may "expire" and become inaccessible within the context of the ephemeral message group 506, prior to the ephemeral message group 506 itself expiring in terms of the group duration parameter 510. The group duration parameter 510, group participation parameter 512, and message receiver identifier 518 each provide input to a group timer 516, which operationally determines, firstly, whether a particular ephemeral message 502 of the ephemeral message group 506 will be displayed to a particular receiving user and, if so, for how long. Note that the ephemeral message group 506 is also aware of the identity of the particular receiving user as a result of the message receiver identifier 518.

Accordingly, the group timer 516 operationally controls the overall lifespan of an associated ephemeral message group 506, as well as an individual ephemeral message 502 included in the ephemeral message group 506. In one embodiment, each and every ephemeral message 502 within the ephemeral message group 506 remains viewable and accessible for a time-period specified by the group duration parameter 510. In a further embodiment, a certain ephemeral message 502 may expire, within the context of ephemeral message group 506, based on a group participation parameter 512. Note that a message duration parameter 508 may still determine the duration of time for which a particular ephemeral message 502 is displayed to a receiving user, even within the context of the ephemeral message group 506. Accordingly, the message duration parameter 508 determines the duration of time that a particular ephemeral message 502 is displayed to a receiving user, regardless of whether the receiving user is viewing that ephemeral message 502 inside or outside the context of an ephemeral message group 506.

The ephemeral timer system 504 may furthermore operationally remove a particular ephemeral message 502 from the ephemeral message group 506 based on a determination that it has exceeded an associated group participation parameter 512. For example, when a sending user has established a group participation parameter 512 of 24 hours from posting, the ephemeral timer system 504 will remove the relevant ephemeral message 502 from the ephemeral message group 506 after the specified 24 hours. The ephemeral timer system 504 also operates to remove an ephemeral message group 506 either when the group participation parameter 512 for each and every ephemeral message 502 within the ephemeral message group 506 has expired, or when the ephemeral message group 506 itself has expired in terms of the group duration parameter 510.

In certain use cases, a creator of a particular ephemeral message group 506 may specify an indefinite group duration parameter 510. In this case, the expiration of the group participation parameter 512 for the last remaining ephemeral message 502 within the ephemeral message group 506 will determine when the ephemeral message group 506 itself expires. In this case, a new ephemeral message 502, added to the ephemeral message group 506, with a new group participation parameter 512, effectively extends the life of an ephemeral message group 506 to equal the value of the group participation parameter 512.

Responsive to the ephemeral timer system 504 determining that an ephemeral message group 506 has expired (e.g., is no longer accessible), the ephemeral timer system 504 communicates with the location sharing system 100 (and, for example, specifically the location sharing client application 104) to cause an indicium (e.g., an icon) associated with the relevant ephemeral message group 506 to no longer be displayed within a user interface of the location sharing client application 104. Similarly, when the ephemeral timer system 202 determines that the message duration parameter 508 for a particular ephemeral message 502 has expired, the ephemeral timer system 504 causes the location sharing client application 104 to no longer display an indicium (e.g., an icon or textual identification) associated with the ephemeral message 502.

Figure 6:
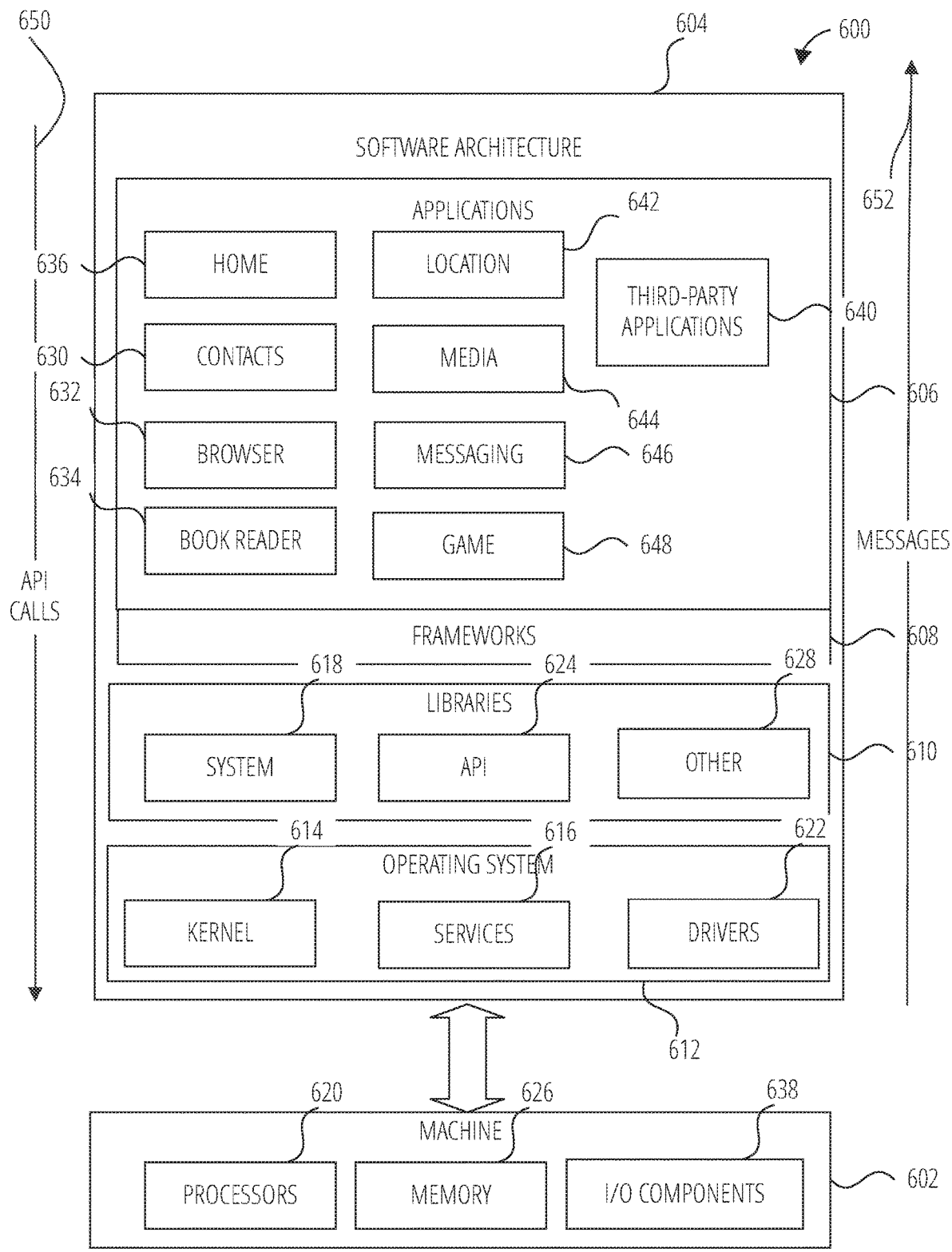
FIG. 6 is block diagram showing a software architecture within which the present disclosure may be implemented, in accordance with some example embodiments.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers). WI-FI® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC). Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as third-party applications 640. The applications 606 are programs that execute functions defined in the programs. Various programming languages can be employed to create one or more of the applications 606, structured in a variety of manners, such as object-oriented programming languages (e.g., Objective-C. Java. or C++) or procedural programming languages (e.g., C or assembly language). In a specific example, the third-party applications 640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 640 can invoke the API calls 650 provided by the operating system 612 to facilitate functionality described herein.

Figure 7:
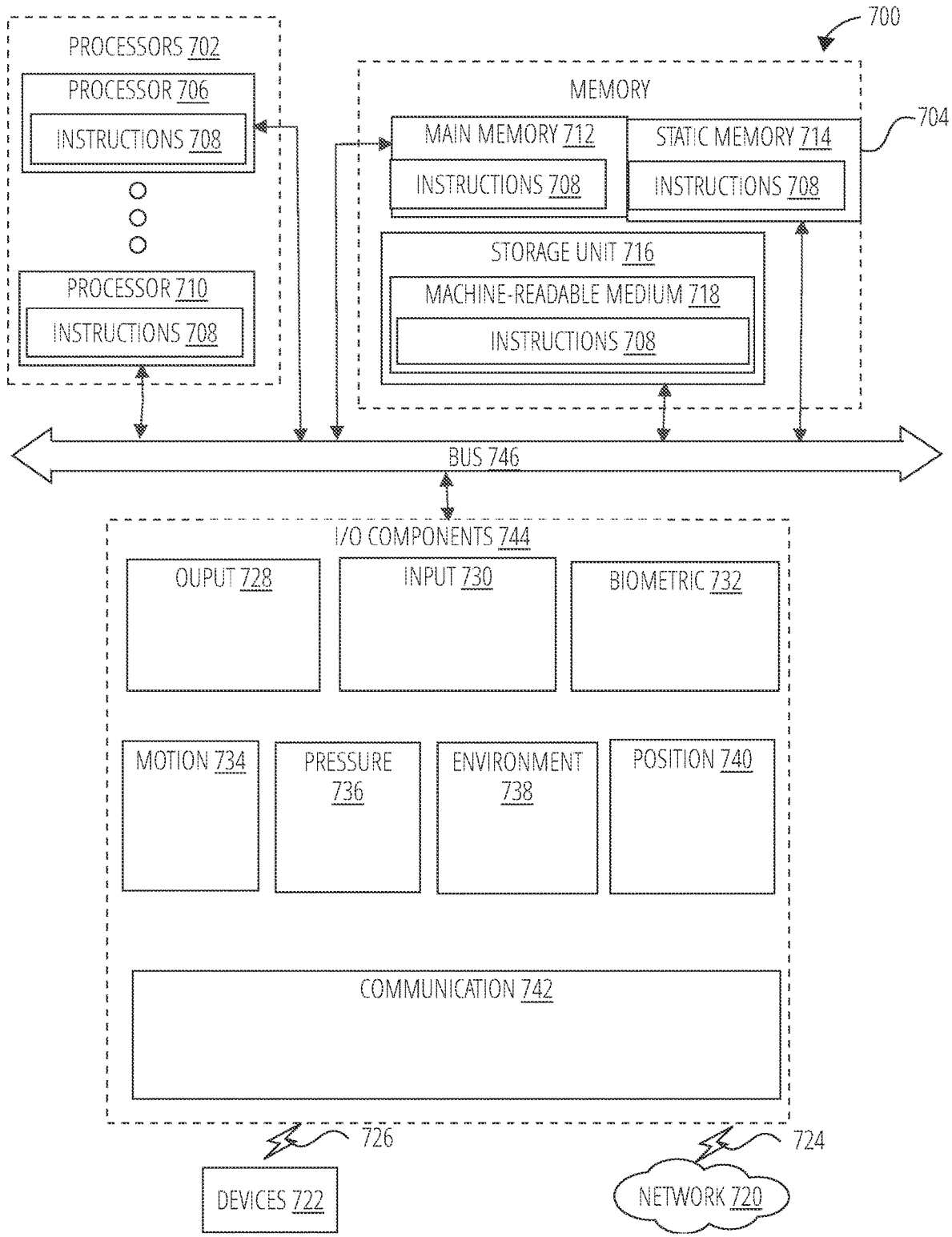
FIG. 7 is a diagrammatic representation of a machine, in the form of a computer system within which a set of instructions may be executed for causing the machine to perform any one or more of the methodologies discussed, in accordance with some example embodiments.

FIG. 7 is a diagrammatic representation of a machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 744, which may be configured to communicate with each other via a bus 746. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 746. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 744 may include a wide variety of components to receive input, provide output, produce output, transmit information, exchange information, capture measurements, and so on. The specific I/O components 744 that are included in a particular machine will depend on the type of machine. For example, portable machines such as mobile phones may include a touch input device or other such input mechanisms, while a headless server machine will likely not include such a touch input device. It will be appreciated that the I/O components 744 may include many other components that are not shown in FIG. 7. In various example embodiments, the I/O components 744 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In embodiments, the I/O components 744 include a pressure component 736 (e.g., a barometer).

In further example embodiments, the I/O components 744 may further include biometric components 732, motion components 734, environmental components 738, or position components 740, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 738 include, for example, illumination sensor components (e.g., photometer), temperature sensor components (e.g., one or more thermometers that detect ambient temperature), humidity sensor components, acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 740 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 744 further include communication components 742 operable to couple the machine 700 to a network 720 or devices 722 via a coupling 724 and a coupling 726, respectively. For example, the communication components 742 may include a network interface component or another suitable device to interface with the network 720. In further examples, the communication components 742 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 742 may detect identifiers or include components operable to detect identifiers. For example, the communication components 742 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code. Data Matrix. Dataglyph, MaxiCode, PDF417, Ultra Code. UCC RSS-2D bar code, and other optical codes), or acoustic detection components (e.g., microphones to identify tagged audio signals). In addition, a variety of information may be derived via the communication components 742, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 742) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

Figure 8:
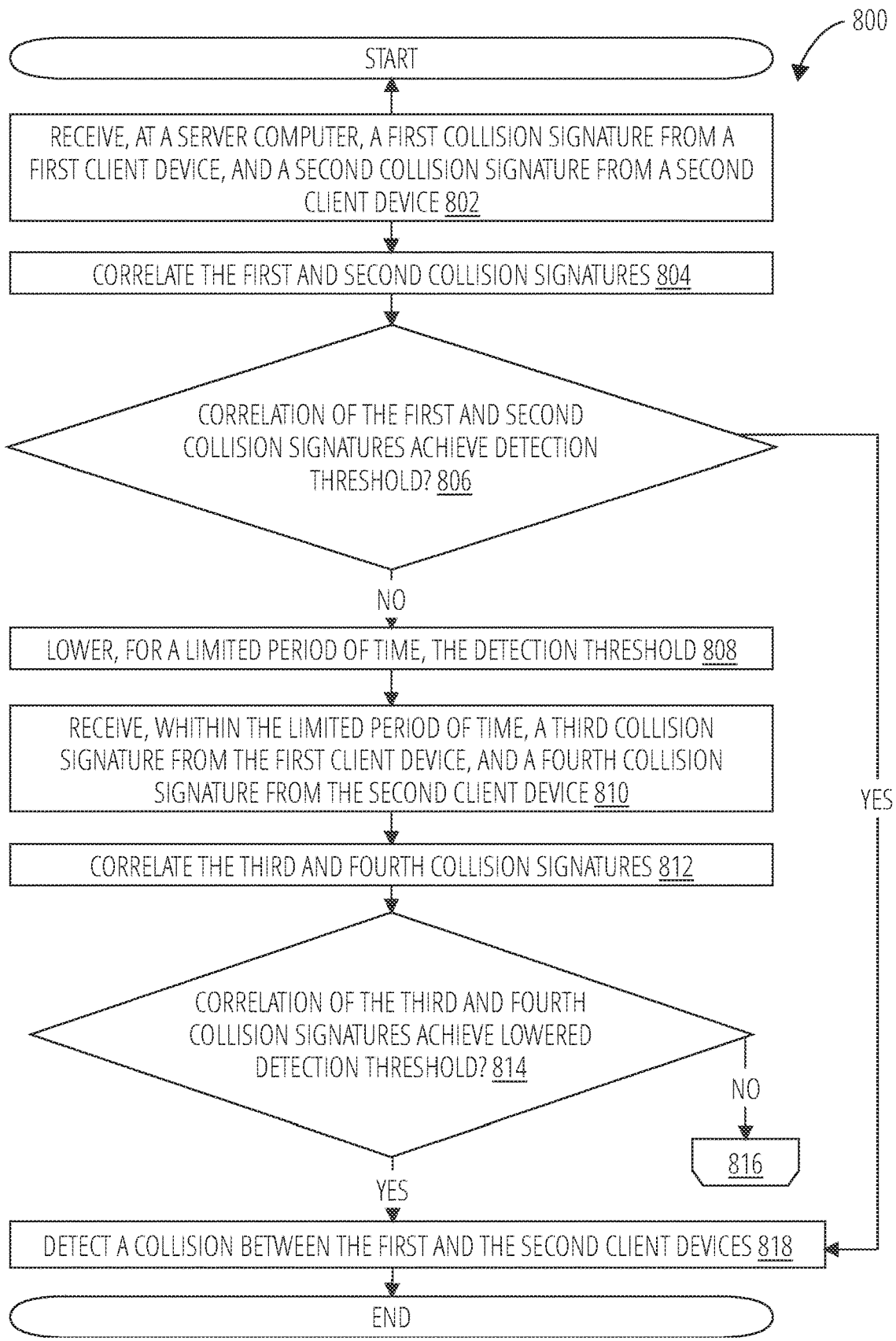
FIG. 8 illustrates a method in accordance with one embodiment.

FIG. 8 is a flowchart illustrating a method 800 for detecting a physical collision between two client devices. The method 800 may be embodied in computer-readable instructions for execution by one or more processors (e.g., processor 402) such that the steps of the method 800 may be performed in part or in whole by functional components (e.g., correlation component 406, threshold adjustment component 408, detection component 410) of a processing environment 400 of a system (e.g., application server 112); accordingly, the method 800 is described below by way of example with reference thereto. However, it shall be appreciated that the method 800 may be deployed on various other hardware configurations and is not intended to be limited to the functional components of the processing environment 400.

Prior to block 802, the server computer might need to receive an authorization from each of the users to perform an action in response to detecting a collision between the user's phone and another user's phone, such as initiating a communication session between the two phones, transferring data from the user's phone to another user's phone, receiving data from another user's phone, and sending an electronic communication to a third user.

In block 802, the server computer (e.g., application server 112) receives, from a first client device, an electronic communication comprising a first collision signature, and, from a second client device, an electronic communication comprising a second collision signature. In some embodiments, each collision signature includes a timestamp, a location, and a sequence of acceleration instant values acquired by an accelerometer of the client device. In some embodiments, as described in more details in relation to FIG. 14, the client device generates a collision signature upon detecting an abrupt change of acceleration corresponding to a light blow or a jolting collision.

In block 804, the server computer correlates the first collision signature and the second collision signature. The correlation may be temporal (as described in relation to FIG. 9), spatial (as described in relation to FIG. 10), spatio-temporal (as described in relation to FIG. 11) or based on any other correlation method.

In decision block 806, the server computer determines whether the correlation of the first and second collision signatures achieves the detection threshold. In some embodiments, the correlation of the first and second collision signatures achieves the detection threshold when a distance between the location of the first collision signature and the location of the second collision signature is below a distance threshold, and a timespan between the timestamp of the first collision signature and the timestamp of the second collision signature is below a time threshold.

If the correlation of the first and second collision signatures achieves the detection threshold, the method goes to block 818, and the server computer detects a collision between the first and second client devices.

If the correlation of the first and second collision signatures does not achieve the detection threshold, the method goes to block 808, and the server computer lowers, for a limited period of time (e.g., 5 seconds), the detection threshold associated with the pair of client devices including the first and second client devices. The detection threshold is initially set at a first value. Upon receiving the first and second collision signatures and determining that the correlation of the first and second collision signatures does not achieve the first value of the detection threshold, the detection threshold is lowered to a second value for the limited period of time. The server computer stores the second value of the lowered detection threshold in the threshold table 308 together with identifiers of the first and second client devices and with a period of time during with the detection threshold will be lowered for the specific pair of client devices. In some embodiments, the detection threshold is only lowered upon determining that the correlation of the first and second collision signatures although not achieving the detection threshold, still achieves a lower threshold not sufficient to establish with sufficient certainty that the first and second signatures correspond to the same physical collision but sufficient to determine that the first and second signatures are likely to correspond to the same physical collision. In some embodiments, lowering the detection threshold comprises increasing the distance threshold and/or increasing the time threshold.

In block 810, the server computer receives, within the limited period of time, a third collision signature from the first client device, and a fourth collision signature from the second client device.

In block 812, the server computer correlates the third collision signature and the fourth collision signature. The correlation may be temporal (as described in relation to FIG. 9), spatial (as described in relation to FIG. 10), spatio-temporal (as described in relation to FIG. 11, or based on any other correlation method.

In decision block 814, the server computer determines whether the correlation of the third and fourth collision signatures achieves the lowered detection threshold associated with the pair of client devices (which is temporarily set at the lower second value).

If the correlation of the third and fourth collision signatures achieves the detection threshold associated with the pair of client devices (which is temporarily set at a lower second value), the method goes to block 818, and the server computer detects a collision between the first and second client devices. Detecting a collision between the first and second client devices may include generating an identifier indicating that a collision between the first and second client devices occurred and/or storing a record of a collision between the first and second client devices.

If the correlation of the third and fourth collision signatures does not achieve the detection threshold associated with the pair of client devices (which is temporarily set at a lower second value), the method goes to closing loop block 816, and the server computer determines that the third and fourth signatures do not correspond to a collision between the first and second client devices. The third and fourth collision signatures may still be independently matched with other signatures.

In some embodiments, the server computer spatially correlates the collision signatures to identify two collision signatures corresponding to the same physical collision. Each collision signature includes a timestamp corresponding to the acquisition time of the acceleration data by the client device. Correlating two collision signatures includes computing a timespan between the timestamps of the two collision signatures.

Figure 9:
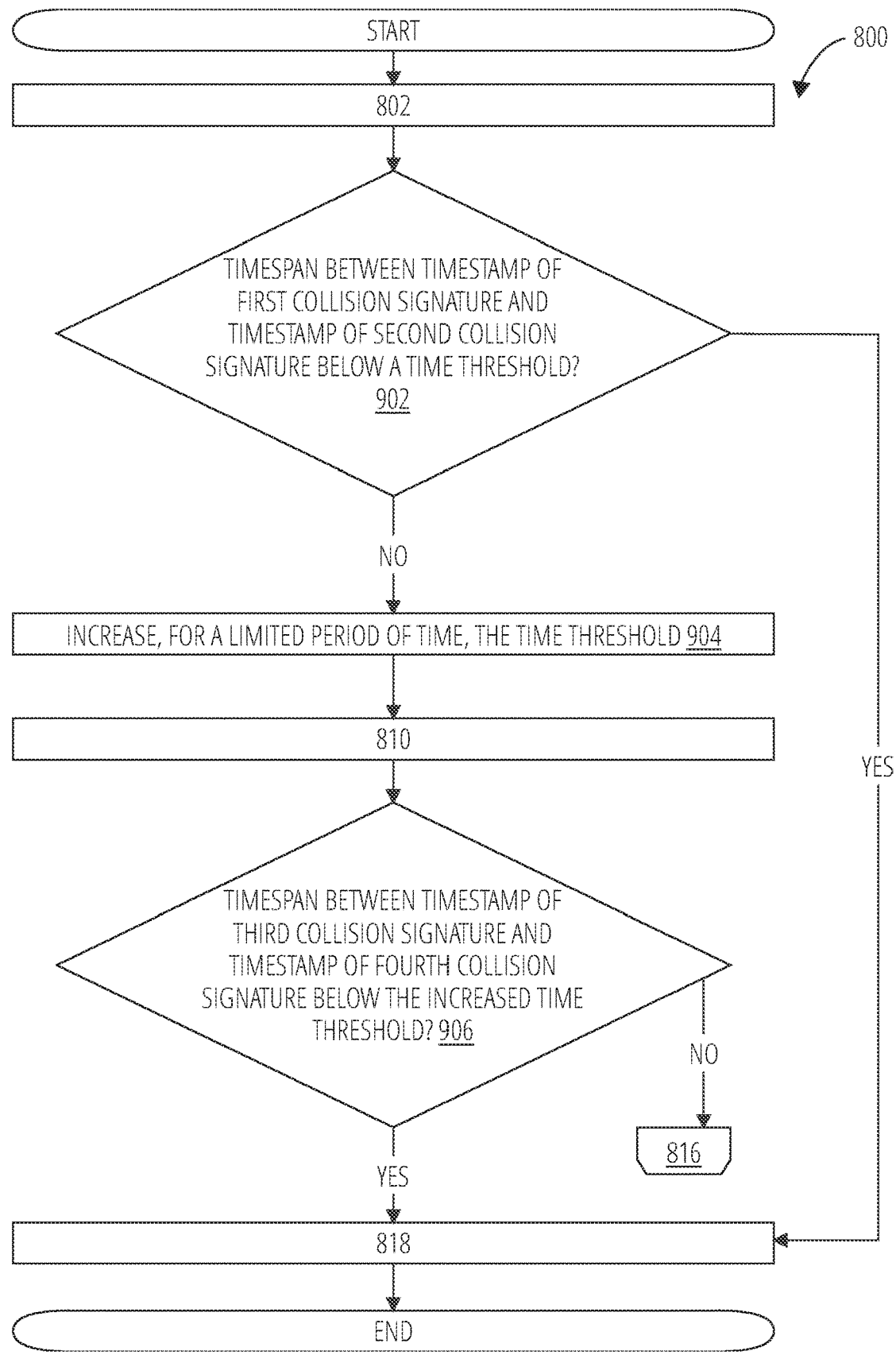
FIG. 9 illustrates a method in accordance with one embodiment.

As shown in FIG. 9, the method 800 may further include a decision block 902, a block 904, and decision block 906 according to some embodiments. Consistent with some embodiments, decision block 902 may be performed as part (e.g., as sub-blocks or as a sub-method) of decision block 806, where the system determines whether the correlation of the first and second collision signature achieve the detection threshold. Consistent with some embodiments, block 904 may be performed as part (e.g., as sub-blocks or as a sub-method) of block 808, where the system lowers the detection threshold for a limited period of time. Consistent with some embodiments, decision block 906 may be performed as part (e.g., as sub-blocks or as a sub-method) of decision block 814, where the system determines whether the correlation of the third and fourth collision signature achieve the lowered detection threshold.

In decision block 902, the server computer computes a timespan between the timestamp of the first collision signature and the timestamp of the second collision signature and determines whether the timespan between the timestamp of the first collision signature and the timestamp of the second collision signature is below a time threshold. If the timespan between the timestamp of the first collision signature and the timestamp of the second collision signature is below the time threshold, the server computer goes to block 818 and detects a collision between the first and second client devices. If the timespan between the timestamp of the first collision signature and the timestamp of the second collision signature is above the time threshold, the method goes to block 904 and increases the time threshold associated with the pair of client devices for a limited period of time (e.g., 5 seconds).

In decision block 906, the server computer determines whether a timespan between the timestamp of the third collision signature and the timestamp of the fourth collision signature is below the time threshold associated with the pair of client devices (which is temporarily set at the higher value). If the timespan between the timestamp of the third collision signature and the timestamp of the fourth collision signature is below the time threshold associated with the pair of client devices (which is temporarily set at the higher value), the method goes to block 818, and the server computer detects a collision between the first and the second client devices. If the second timespan between the timestamp of the third collision signature and the timestamp of the fourth collision signature is the time threshold associated with the pair of client devices (which is temporarily set at the higher value), the method goes to closing loop block 816, and the server computer determines that the third and fourth collision signatures do not correspond to a collision between the first and second client devices.

In some embodiments, the server computer spatially correlates the collision signatures to identify two collision signatures corresponding to the same physical collision. Each collision signature includes a location corresponding to the location of the client device when the client device acquired the acceleration data. Correlating two collision signatures includes computing a distance between the locations of the two collision signatures. The location of the client device includes a latitude, a longitude and in some embodiments, an altitude.

Figure 10:
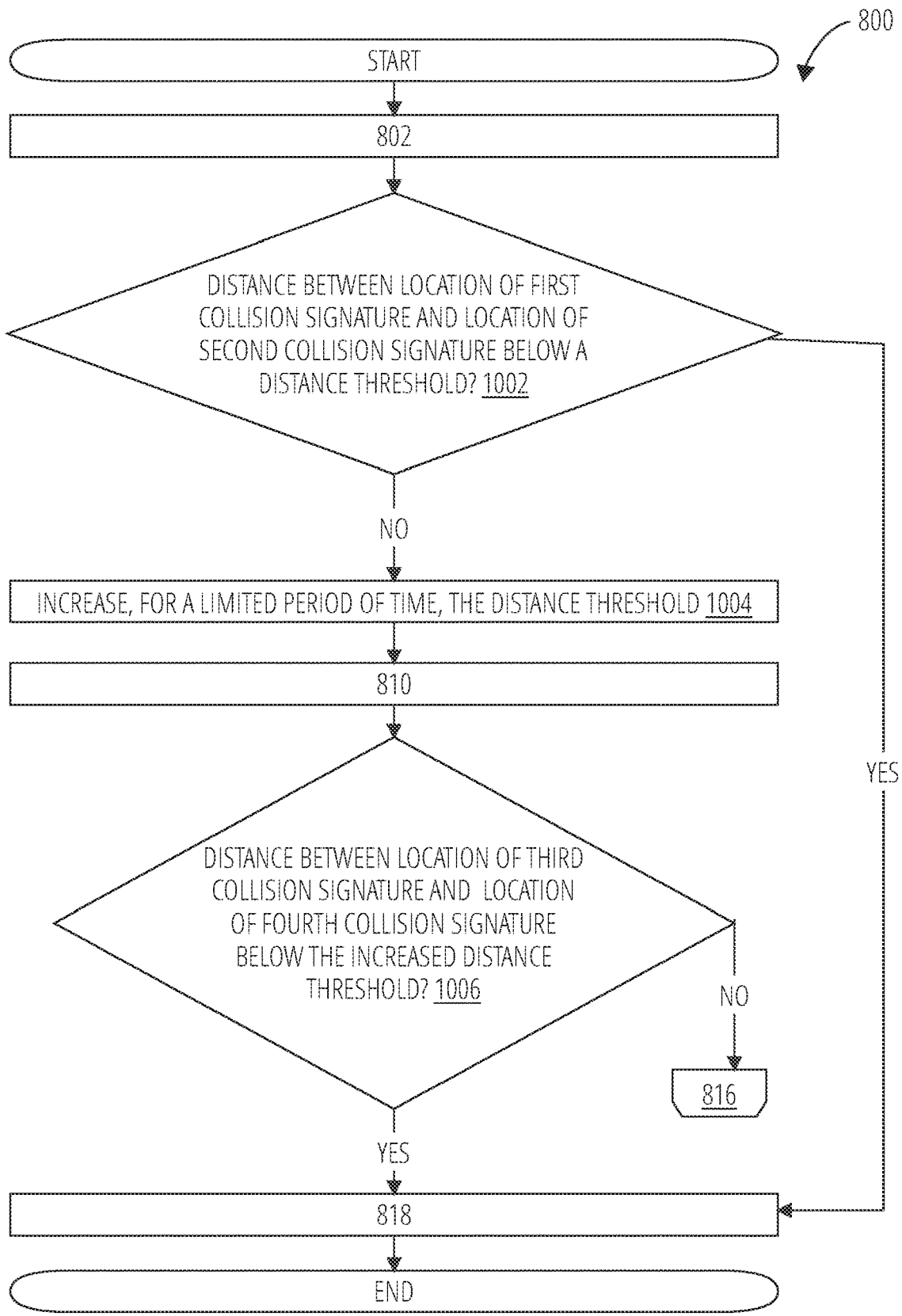
FIG. 10 illustrates a method in accordance with one embodiment.

As shown in FIG. 10, the method 800 may further include a decision block 1002, a block 1004, and decision block 1006 according to some embodiments. Consistent with some embodiments, decision block 1002 may be performed as part (e.g., as sub-blocks or as a sub-method) of decision block 806, where the system determines whether the correlation of the first and second collision signature achieve the detection threshold. Consistent with some embodiments, block 1004 may be performed as part (e.g., as sub-blocks or as a sub-method) of block 808, where the system lowers the detection threshold for a limited period of time. Consistent with some embodiments, decision block 1006 may be performed as part (e.g., as sub-blocks or as a sub-method) of decision block 814, where the system determines whether the correlation of the third and fourth collision signature achieve the lowered detection threshold.

In decision block 1002, the server computer computes a distance between the location of the first collision signature and the location of the second collision signature and determines whether the distance between the location of the first collision signature and the location of the second collision signature is below a distance threshold associated with the pair of client devices. In response to determining that the distance between the location of the first collision signature and the location of the second collision signature is below the distance threshold associated with the pair of client devices, the server computer goes to block 816 and detects a collision between the first and second client devices. Upon receiving the first and second collision signatures and determining that the distance between the location of the first collision signature and the location of the second collision signature is above the distance threshold associated with the pair of client devices, the server computer goes to block 1004 and increases the distance threshold associated with the pair of client devices for a limited period of time (e.g., 5 seconds).

In decision block 1006, the server computer determines whether a distance between the location of the third collision signature and the location of the fourth collision signature is below the distance threshold associated with the pair of client devices (which is temporarily set at the higher value). In response to determining that the distance between the location of the third collision signature and the location of the fourth collision signature is below the distance threshold associated with the pair of client devices (which is temporarily set at the higher value), the server computer detects a collision between the first and the second client devices via the server computer. If the distance between the location of the third collision signature and the location of the fourth collision signature is above the distance threshold associated with the pair of client devices (which is temporarily set at the higher value), the method goes to closing loop block 816, and the server computer determines that the third and fourth collision signatures do not correspond to a collision between the first and second client devices.

In some embodiments, the server computer spatio-temporally correlates the collision signatures to identify two collision signatures corresponding to the same physical collision. The server computer can correlate the collision signatures based on distance first and then based on time. However, correlating the collision signatures based on time first and then based on distance is more efficient in terms of computation time. Each collision signature includes a timestamp corresponding to the acquisition time of the acceleration data by the client device and a location corresponding to the location of the client device when the client device acquired the acceleration data. Correlating two collision signatures includes computing a distance between the locations of the two collision signatures and computing a timespan between the timestamps of the two collision signatures.

Figure 11:
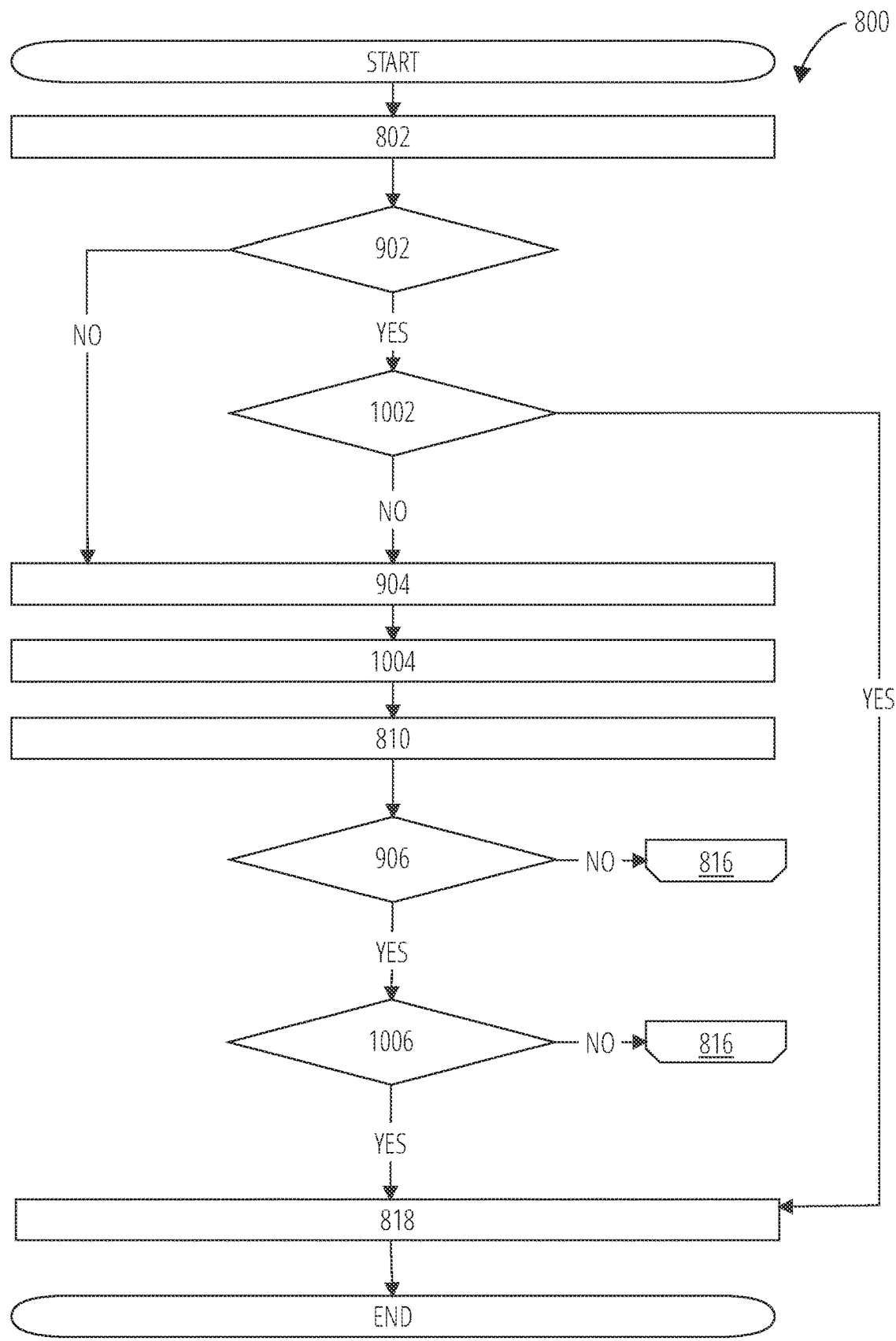
FIG. 11 illustrates a method in accordance with one embodiment.

As shown in FIG. 11, the method 800 may include decision block 902, block 904, decision block 906, and decision block 1002, block 1004, and decision block 1006 according to some embodiments. Consistent with some embodiments, decision block 902 and decision block 1002 may be performed as part (e.g., as sub-blocks or as a sub-method) of decision block 806, where the system determines whether the correlation of the first and second collision signature achieve the detection threshold. Consistent with some embodiments, block 904 and block 1004 may be performed as part (e.g., as sub-blocks or as a sub-method) of block 808, where the system lowers the detection threshold for a limited period of time. Consistent with some embodiments, decision block 906 and decision block 1006 may be performed as part (e.g., as sub-blocks or as a sub-method) of decision block 814, where the system determines whether the correlation of the third and fourth collision signature achieve the lowered detection threshold.

In decision block 902, the server computer computes a timespan between the timestamp of the first collision signature and the timestamp and determines whether the timespan is below a time threshold. If the timespan is below the time threshold, the server computer goes to decision block 1002. If the first timespan is above the time threshold, the method goes to block 904 where the computer server increases the time threshold for a limited period of time (e.g., 5 seconds), and block 1004 where the server computer increases the distance threshold for a limited period of time (e.g., 5 seconds).

In decision block 1002, the server computer computes a distance between the location of the first collision signature and the location of the second collision signature and determines whether the distance between the location of the first collision signature and the location of the second signature is below a distance threshold. If the distance between the location of the first collision signature and the location of the second collision signature is below the distance threshold, the server computer goes to block 818 and detects a collision between the first and second client devices. If the distance between the location of the first collision signature and the location of the second collision signature is above the distance threshold, the method goes to block 904 where the computer server increases the time threshold for a limited period of time (e.g., 5 seconds), and block 1004 where the server computer increases the distance threshold for a limited period of time (e.g., 5 seconds).

In decision block 906, the server computer determines whether a timespan between the timestamp of the third collision signature and the timestamp of the fourth collision signature is below the increased time threshold. In response to determining that the second timespan between the timestamp of the third collision signature and the timestamp of the fourth collision signature is below the increased time threshold, the method goes to decision block 1006, where the server computer determines whether a distance between the location of the third collision signature and the location of the fourth collision signature is below the increased distance threshold. In response to determining that the distance between the location of the third collision signature and the location of the fourth collision signature is below the increased distance threshold, the server computer detects a collision between the first and the second client devices via the server computer.

GPS measurements can be affected by several types of random errors and biases. As a consequence, the location determined by a client device can be grossly inaccurate. To avoid false positives, in some embodiments, prior to correlating the first and second collision signatures, the server computer discards a collision signature if the location associated with the collision signature is not a location at which the user stayed within a maximum range for a minimum amount of time. Indeed, if the collision signature is not a location at which the user stayed within a maximum range for a minimum amount of time, the location associated with the collision is probably grossly inaccurate. In some embodiments, the server computer aggregates location data received from a client device over time into one or more visit points of the user. A visit point may be defined as a location where the user stayed within a maximum range for a minimum amount of time. The server computer determines whether the location included in the collision signature corresponds to a visit point of the user. If the location included in the first collision signature does not correspond to a visit point of the user, the server computer discards the collision signature.

In some embodiments, a Discrete Global Grid (DGG) (e.g., S2 Grid System) is used to pre-filter the collision signatures. The DGG is a mosaic which forms a partition of the Earth's surface into a plurality of geographical cells. For each collision signature, the server computer determines a geographical cell associated with the location of the collision signature. Correlating two collision signatures includes, prior to spatio-temporally correlating the two collision signatures, determining whether the two collision signatures are associated with the same geographical cell or two geographical cells that are direct neighbors. If the geographical cell associated with the one of the collision signatures is not the same as the geographical cell associated with the other collision signature, nor a geographical cell that is a direct neighbor of the geographical cell associated with the other collision signature, the server computer determines that the two collision signatures do not correspond to a same collision.

Figure 12:
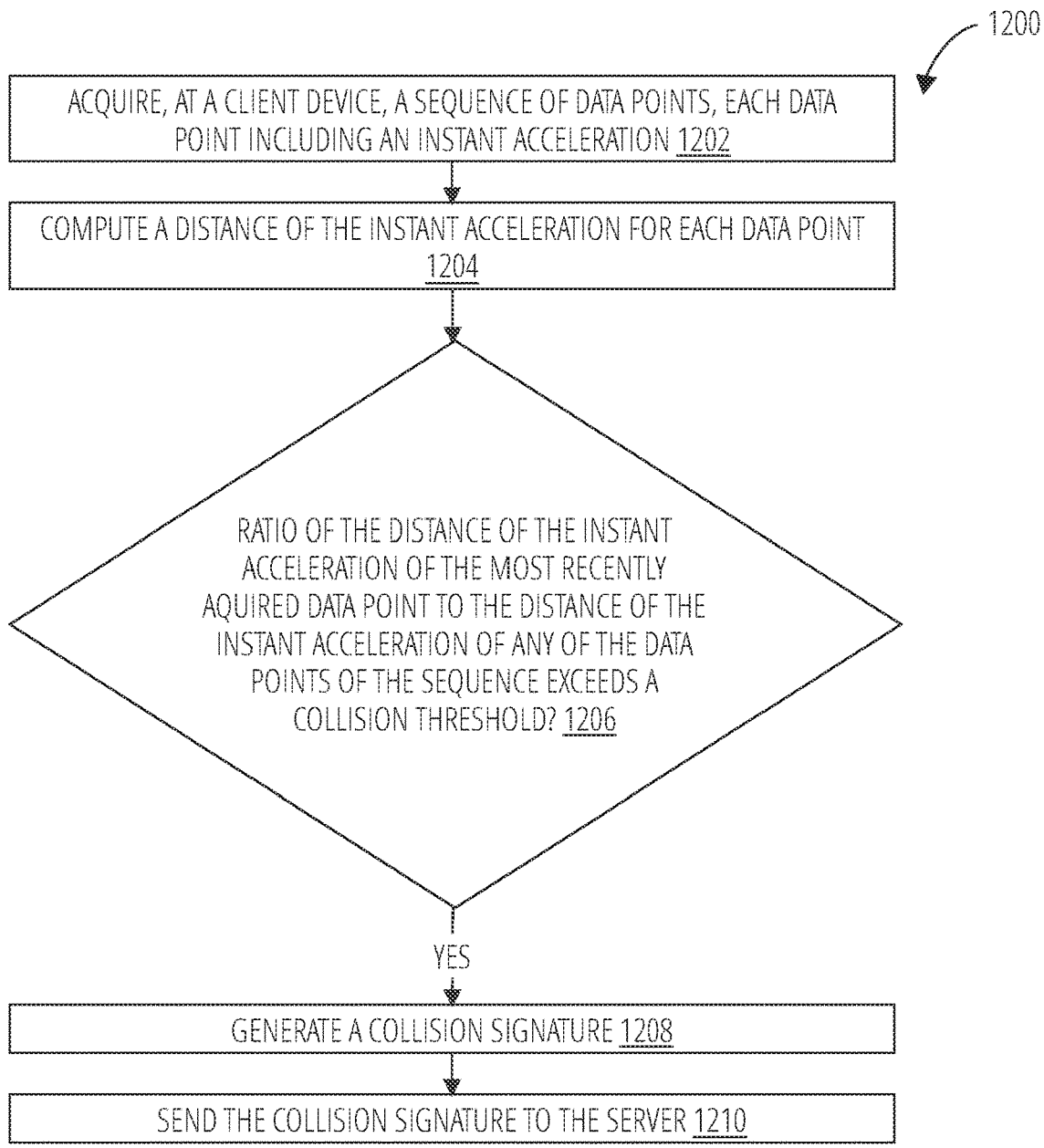
FIG. 12 illustrates a method in accordance with one embodiment.

FIG. 12 is a flowchart illustrating a method 1200 for detecting, at a client device, an abrupt change of acceleration corresponding to a collision and generating a collision signature. The method 1200 may be embodied in computer-readable instructions for execution by one or more processors of a machine (e.g., machine 700) such that the steps of the method 1200 may be performed in part or in whole by functional components of a client device (e.g., client device 102); accordingly, the method 1200 is described below by way of example with reference thereto. However, it shall be appreciated that the method 1200 may be deployed on various other hardware configurations and is not intended to be limited to the functional components of the client device.

In block 1202, the client device acquires a sequence of data points. Each data point includes an instant acceleration, a location (e.g., latitude, longitude, and in some embodiments altitude) and a timestamp. The instant acceleration may be acquired by an accelerometer integrated in the client device. The instant acceleration is measured along 3 axes. In some embodiments, the client device periodically acquires data points. The frequency of acquisition may for example be 50 Hz-100 Hz.

In block 1204, the client device computes a distance (e.g., Euclidian distance) of the instant acceleration of each data point.

In decision block 1206, the client device determines whether the ratio of the distance of the instant acceleration of the most recently acquired data point to the distance of the instant acceleration of any of the other data points of the sequence exceeds a collision threshold (e.g., 15). The collision threshold can be set from the server (e.g., via the location sharing server application 114).

If the ratio exceeds the collision threshold (e.g., 15), the client device generates, in block 1208, a collision signature, and sends, in block 1210, the collision signature to the application server (e.g., application server 112). The collision signature may include a location and a timestamp associated with the most recently acquired data point. In some embodiments, the collision signature includes the sequence of data points acquired by the client device.

Knocking a phone against a horizontal surface, such as a table, may generate acceleration data similar to the acceleration data generated when the phone is knocked into another phone. In some embodiments, gravity data is used to determine whether the phone collided with another phone or with a horizontal surface.

In some embodiments, each data point further includes gravity data acquired by a gravity sensor embedded in the client device. The gravity data measures the acceleration effect of Earth's gravity on the client device. The gravity data may be derived from the acceleration data acquired by the accelerometer of the client device. Data acquired by other sensors of the client device (e.g. the magnetometer and the gyroscope) may be used to remove linear acceleration from the acceleration data acquired by the accelerometer. The client device determines a tilt of the client device relative to the face of the Earth. If the tilt of the client device relative to the face of the Earth is less than a tilt threshold (e.g., 30 degree), the collision detected is likely to be a collision against a horizontal surface such as a table as opposed to a collision against another phone, and the client device discards the data point without generating a collision signature.

Figure 13:
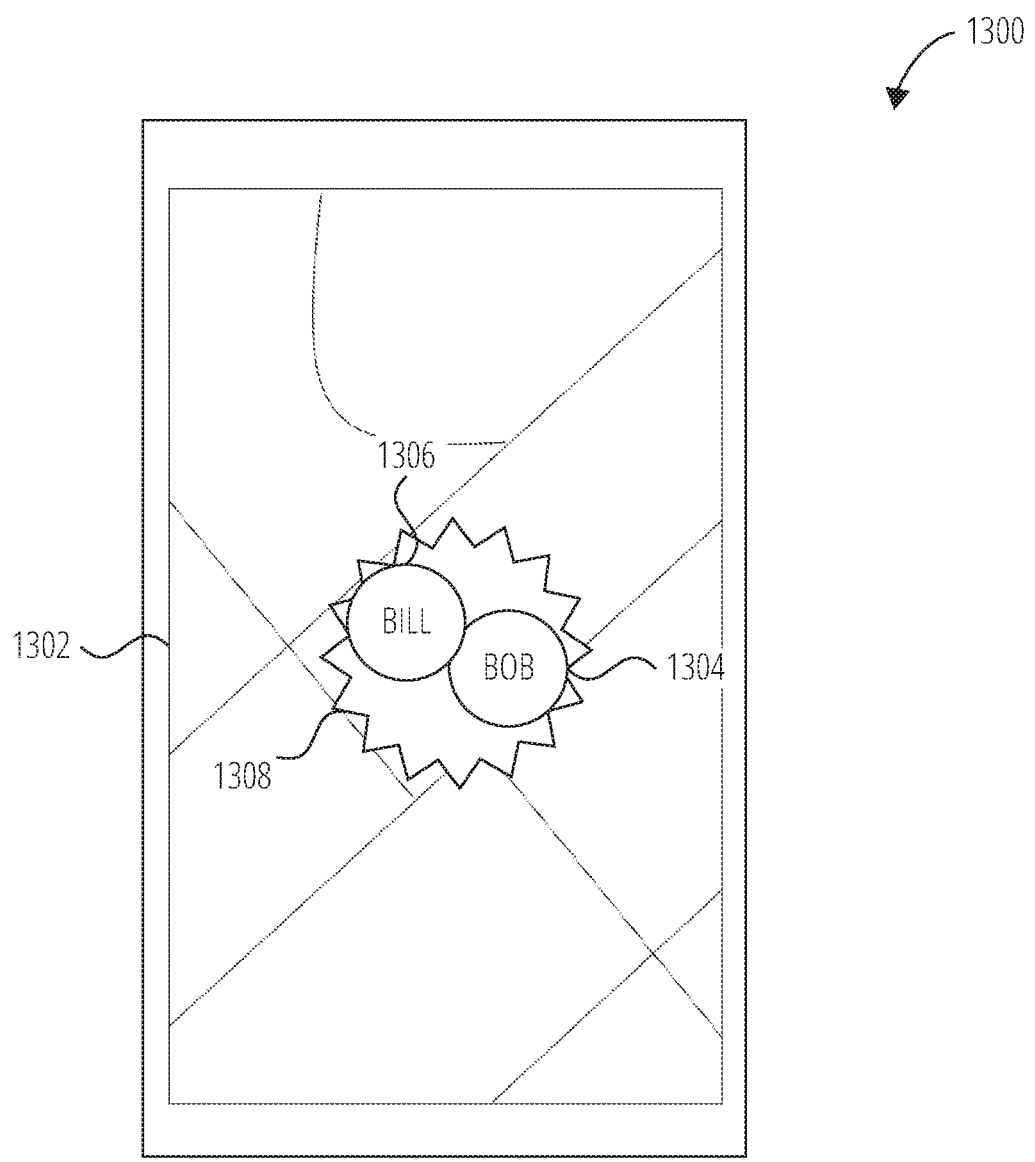
FIG. 13 illustrates a user interface in accordance with one embodiment.

User interface 1300 shown in FIG. 13 is an example of a user interface that may be displayed on a display screen of a third user. User interface 1300 includes a map 1302 depicting an avatar 1304 of the first user, and an avatar 1306 of the second user.

An avatar (e.g., avatar 1304, avatar 1306) is a media content item associated with the first user and that may include a still image, animated image, video, or other content. The avatar may include a profile picture or a default icon. The location of the user's avatar on the map GUI is representative of the current location of the user. The system updates the location of the first user's avatar on the map as the location of the user changes. If the system detects a collision between the client device of the first user and the client device of the second user, the map displays a text or an icon 1308 or a combination of both indicating that the first and second user are spending time together. An icon is a media content item that may include a still image, animated image, video, or other content.

The detection of a collision between the client device of the first user and the client device of the second user can also trigger various actions, such as sending a notification to a group of users (e.g., users that are friends with both the first and second users) and unlocking certain functionalities of the application for the first and the second users.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, at a server computer, a first electronic communication containing a first collision signature from a first client device, and a second electronic communication containing a second collision signature from a second client device;
correlating, using one or more processors of the server computer, the first collision signature and the second collision signature;
based on determining that a correlation of the first collision signature and the second collision signature does not achieve a detection threshold, lowering, for a limited period of time, the detection threshold;
receiving, within the limited period of time, at the server computer, a third electronic communication containing a third collision signature from the first client device, and a fourth electronic communication containing a fourth collision signature from the second client device;

correlating, using the one or more processors of the server computer, the third collision signature and the fourth collision signature; and based on determining that a correlation of the third collision signature and the fourth collision signature achieves the lowered detection threshold, detecting a collision between the first and second client devices.

2. The method of claim 1, wherein correlating the first collision signature and the second collision signature comprises temporally correlating the first collision signature and the second collision signature, and wherein determining that the correlation of the first and second collision signatures does not achieve the detection threshold comprises determining that a timespan between a timestamp of the first collision signature and a timestamp of the second collision signature is below a time threshold;

wherein lowering the detection threshold comprises increasing the time threshold; and wherein correlating the third collision signature and the fourth collision signature comprises temporally correlating the third collision signature and the fourth collision signature, and wherein determining that the correlation of the third collision signature and the fourth collision signature achieves the lowered detection threshold comprises determining that a timespan between the timestamp of the third collision signature and the timestamp of the fourth collision signature is below the increased time threshold.

3. The method of claim 1, wherein correlating the first collision signature and the second collision signature comprises spatially correlating the first collision signature and the second collision signature, and wherein determining that the correlation of the first and second collision signatures does not achieve the detection threshold comprises determining that a distance between a location of the first collision signature and a location of the second collision signature is below a distance threshold;

wherein lowering the detection threshold comprises increasing the distance threshold; and wherein correlating the third collision signature and the fourth collision signature comprises spatially correlating the third collision signature and the fourth collision signature, and wherein determining that the correlation of the third collision signature and the fourth collision signature achieves the lowered detection threshold comprises determining that a distance between the location of the third collision signature and the location of the fourth collision signature is below the increased distance threshold.

4. The method of claim 1, wherein each collision signature includes a sequence of instant acceleration readings acquired by a corresponding client device.

5. The method of claim 1, wherein correlating the first collision signature and the second collision signature comprises:

determining a first geographical cell associated with a location of the first collision signature;

determining a second geographical cell associated with a location of the second collision signature; and determining that the first geographical cell is the same as the second geographical cell or a direct neighbor of the second geographical cell.

6. The method of claim 5, wherein correlating the third collision signature and the fourth collision signature comprises:

determining a third geographical cell associated with a location of the third collision signature;

determining a fourth geographical cell associated with a location of the fourth collision signature; and determining that the third geographical cell is the same as the fourth geographical cell or a direct neighbor of the fourth geographical cell.

7. The method of claim 1, wherein the method further comprises:

receiving location data from the first client device;

determining a plurality of visit points of the first client device by aggregating the location data received from the first client device;

receiving location data from the second client device;

determining a plurality of visit points of the second client device by aggregating the location data received from the second client device;

determining that a location of the first collision signature corresponds to one of the plurality of visit points of the first client device; and determining that a location of the second collision signature corresponds to one of the plurality of visit points of the second client device.

8. The method of claim 7, wherein the method further comprises:

determining that a location of the third collision signature corresponds to one of the plurality of visit points of the first client device; and determining that a location of the fourth collision signature corresponds to one of the plurality of visit points of the second client device.

9. The method of claim 1, further comprising:

in response to detecting a collision between the first and second client devices, creating a communication session between the first and the second client devices via the server computer.

10. The method of claim 1, wherein the first client device is associated with a first user, and the second client device is associated with a second user, the method further comprising:

in response to detecting a collision between the first and second client devices, sending a notification to a third client device associated with a third user that is connected, in a social graph, with both the first and the second users.

11. A system, the system comprising:

one or more processors; and a memory storing instructions that, when executed by the one or more processors, configure the system to perform operations comprising:

receiving a first electronic communication containing a first collision signature from a first client device, and a second electronic communication containing a second collision signature from a second client device;

correlating the first collision signature and the second collision signature;

based on determining that a correlation of the first collision signature and the second collision signature does not achieve a detection threshold, lowering, for a limited period of time, the detection threshold;

receiving, within the limited period of time, a third electronic communication containing a third collision signature from the first client device, and a fourth electronic communication containing a fourth collision signature from the second client device;

correlating the third collision signature and the fourth collision signature; and based on determining that a correlation of the third collision signature and the fourth collision signature achieves the lowered detection threshold, detecting a collision between the first and second client devices.

12. The system of claim 11, wherein correlating the first collision signature and the second collision signature comprises temporally correlating the first collision signature and the second collision signature, and wherein determining that the correlation of the first and second collision signatures does not achieve the detection threshold comprises determining that a timespan between a timestamp of the first collision signature and a timestamp of the second collision signature is below a time threshold;

wherein lowering the detection threshold comprises increasing the time threshold; and wherein correlating the third collision signature and the fourth collision signature comprises temporally correlating the third collision signature and the fourth collision signature, and wherein determining that the correlation of the third collision signature and the fourth collision signature achieves the lowered detection threshold comprises determining that a timespan between the timestamp of the third collision signature and the timestamp of the fourth collision signature is below the increased time threshold.

13. The system of claim 11, wherein correlating the first collision signature and the second collision signature comprises spatially correlating the first collision signature and the second collision signature, and wherein determining that the correlation of the first and second collision signatures does not achieve the detection threshold comprises determining that a distance between a location of the first collision signature and a location of the second collision signature is below a distance threshold;

wherein lowering the detection threshold comprises increasing the distance threshold; and wherein correlating the third collision signature and the fourth collision signature comprises spatially correlating the third collision signature and the fourth collision signature, and wherein determining that the correlation of the third collision signature and the fourth collision signature achieves the lowered detection threshold comprises determining that a distance between the location of the third collision signature and the location of the fourth collision signature is below the increased distance threshold.

14. The system of claim 11, wherein each collision signature includes a sequence of instant acceleration readings acquired by the client device.

15. The system of claim 11, wherein correlating the first collision signature and the second collision signature comprises:

determining a first geographical cell associated with a location of the first collision signature;

determining a second geographical cell associated with a location of the second collision signature; and determining that the first geographical cell is the same as the second geographical cell or a direct neighbor of the second geographical cell.

16. The system of claim 15, wherein correlating the third collision signature and the fourth collision signature comprises:

determining a third geographical cell associated with a location of the third collision signature;

determining a fourth geographical cell associated with a location of the fourth collision signature; and determining that the third geographical cell is the same as the fourth geographical cell or a direct neighbor of the fourth geographical cell.

17. The system of claim 11, wherein the operations further comprise:

receiving location data from the first client device;

determining a plurality of visit points of the first client device by aggregating the location data received from the first client device;

receiving location data from the second client device;

determining a plurality of visit points of the second client device by aggregating the location data received from the second client device;

determining that a location of the first collision signature corresponds to one of the plurality of visit points of the first client device; and determining that a location of the second collision signature corresponds to one of the plurality of visit points of the second client device.

18. The system of claim 17, wherein the operations further comprise:

determining that a location of the third collision signature corresponds to one of the plurality of visit points of the first client device; and determining that a location of the fourth collision signature corresponds to one of the plurality of visit points of the second client device.

19. The system of claim 11, wherein the operations further comprise:

in response to detecting a collision between the first and second client devices, creating a communication session between the first and the second client devices via the server computer.

20. A processor-readable storage device storing processor-executable instructions that, when executed by one or more processors of a machine, cause the machine to perform operations comprising:

receiving a first electronic communication containing a first collision signature from a first client device, and a second electronic communication containing a second collision signature from a second client device;

correlating the first collision signature and the second collision signature;

based on determining that a correlation of the first collision signature and the second collision signature does not achieve a detection threshold, lowering, for a limited period of time, the detection threshold;

receiving, within the limited period of time, a third electronic communication containing a third collision signature from the first client device, and a fourth electronic communication containing a fourth collision signature from the second client device;

correlating the third collision signature and the fourth collision signature; and based on determining that a correlation of the third collision signature and the fourth collision signature achieves the lowered detection threshold, detecting a collision between the first and second client devices.

* * * * *